United States Patent [19]

Suzuki et al.

[11] 4,184,697
[45] Jan. 22, 1980

[54] FRONT WHEEL SUPPORTING DEVICE FOR A MOTOR VEHICLE

[75] Inventors: Ichiro Suzuki, Nagoya; Kazuo Kitamura, Chiryu; Nobuo Wakimoto; Hiroyuki Watanabe, both of Toyota, all of Japan

[73] Assignee: Toyota Jidosha Kogyo Kabushiki-Kaisha, Toyota, Japan

[21] Appl. No.: 861,578

[22] Filed: Dec. 19, 1977

[30] Foreign Application Priority Data

Aug. 29, 1977 [JP] Japan .................. 52/116259[U]

[51] Int. Cl.² ............................................. B60K 5/00
[52] U.S. Cl. ........................... 280/660; 180/291; 280/688
[58] Field of Search .............. 280/688, 689, 96.1, 280/660, 690, 691; 180/64 R

[56] References Cited
U.S. PATENT DOCUMENTS

| | | | |
|---|---|---|---|
| 2,825,580 | 3/1958 | Walker | 280/688 |
| 2,988,160 | 6/1961 | Hooven | 280/688 |
| 3,305,245 | 2/1967 | Eidal | 280/688 |

Primary Examiner—Richard A. Bertsch
Attorney, Agent, or Firm—Koda and Androlia

[57] ABSTRACT

A front wheel supporting device for a motor vehicle including a laterally elongated suspension bracket having a cross-section in substantially a U shape and provided on the undersurface of the forward of a motor vehicle body with the opening of the U directed downwardly and a lower arm bracket supports provided adjacent the opposite ends of lower arm brackets for supporting the forward ends of the lower arms extending inwardly of the front wheels which are disposed outwardly of the lower arm brackets. The lower arm brackets each has in the hollow space thereof a steering gear operationally associated with a steering wheel and a steering rod outwardly extending from the steering gear box. The front wheel supporting device is characterized by an engine mount bracket integrally provided on the suspension bracket at the upper and outer surfaces of the suspension bracket and an engine coupled to and supported by the engine mount bracket.

16 Claims, 4 Drawing Figures

FRONT WHEEL SUPPORTING DEVICE FOR A MOTOR VEHICLE

BACKGROUND OF THE INVENTION

1. Field of Invention

This invention relates to front wheel supporting devices for motor vehicles.

2. Prior Art

In the prior art, front wheel supporting devices for motor vehicles, and in particular for front engine front drive type motor vehicles have been of such an arrangement that the supporting device includes a laterally elongated suspension bracket having a cross-section of substantially U shape and provided on the under surface of a forward portion of the motor vehicle body with the opening of the U directed downwardly and lower arm bracket supports provided adjacent opposite ends of lower arm brackets for supporting the forward ends of lower arms extending inwardly of front wheels provided on the outside of the lower arm brackets. The lower arm brackets each has in the hollow space thereof a steering gear box operationally associated with a steering wheel and a steering rod outwardly extending from the steering gear box.

This construction contemplates that the space may be utilized effectively by locating the lower arm supporting points as forward as possible to bring them closer to the axle shaft to increase the strength of the lower arm support portions. Since the engine mount portions and the suspension bracket have been provided separately, there is a disadvantage that the positional relationship between the engine and the suspension bracket which should be closely adjusted for front drive - front engine type motor vehicles is difficult to achieve. Additionally, this conventional suspension bracket is constructed such that a rod or the like is used for connecting the lower arm support portions to the main body of the suspension bracket and reinforcing plates are closely attached to the vertical walls of the lower arm support portions and engine mount portions along the main body of the suspension bracket for the purpose of reinforcing the front support device. However, because of insufficient strength, there has been another particular drawback in that the plate thickness of the suspension bracket must be increased thereby increasing the weight of the car body. Furthermore, the conventional suspension bracket having its under surface open or having a small lower plate welded to its center portion is of insufficient strength and provides an additional disadvantage in that the plate thickness must be increased.

SUMMARY OF THE INVENTION

Accordingly it is the general object of the present invention to provide a front wheel support device wherein positional relationship between the engine and the suspension bracket can be accurately and easily secured.

It is still another object of the present invention to provide a front wheel support device wherein the strength of the lower arm support portions is sufficient.

It is still another object of the present invention to provide a front wheel support device of sufficient rigidity that the increased plate thickness is not required.

It is an additional object of the present invention to provide a front wheel supporting device which decreases the overall weight of the motor vehicle.

In keeping with the principles of the present invention, the objects are accomplished by a unique front wheel supporting device for a motor vehicle including a laterally elongated suspension bracket having a cross-section substantially in U shape and provided on the under surface of the forward portion of a motor vehicle body with the opening of the U directed downwardly and lower arm bracket supports provided adjacent the opposite ends of the lower arm brackets for supporting the forward ends of lower arms extending inwardly of the front wheels which are in turn provided outside of the lower arm brackets. The lower arm brackets and suspension bracket house in a hollow space thereinbetween a steering gear box operationally associated with the steering wheel and a steering rod outwardly extending from the steering gear box. The front wheel supporting device is further characterized by an engine mount bracket integrally provided on the suspension bracket at the upper and outer surfaces of the suspension bracket and an engine coupled to and supported by the engine mount bracket whereby the strength and rigidity of the front wheel supporting device is increased.

BRIEF DESCRIPTION OF THE DRAWINGS

The above mentioned features and objects of the present invention will become more apparent by reference to the following description taken in conjunction with the accompanying drawings, in which like reference numerals denote like elements and in which.

DETAILED DESCRIPTION OF THE INVENTION

Figure 1:
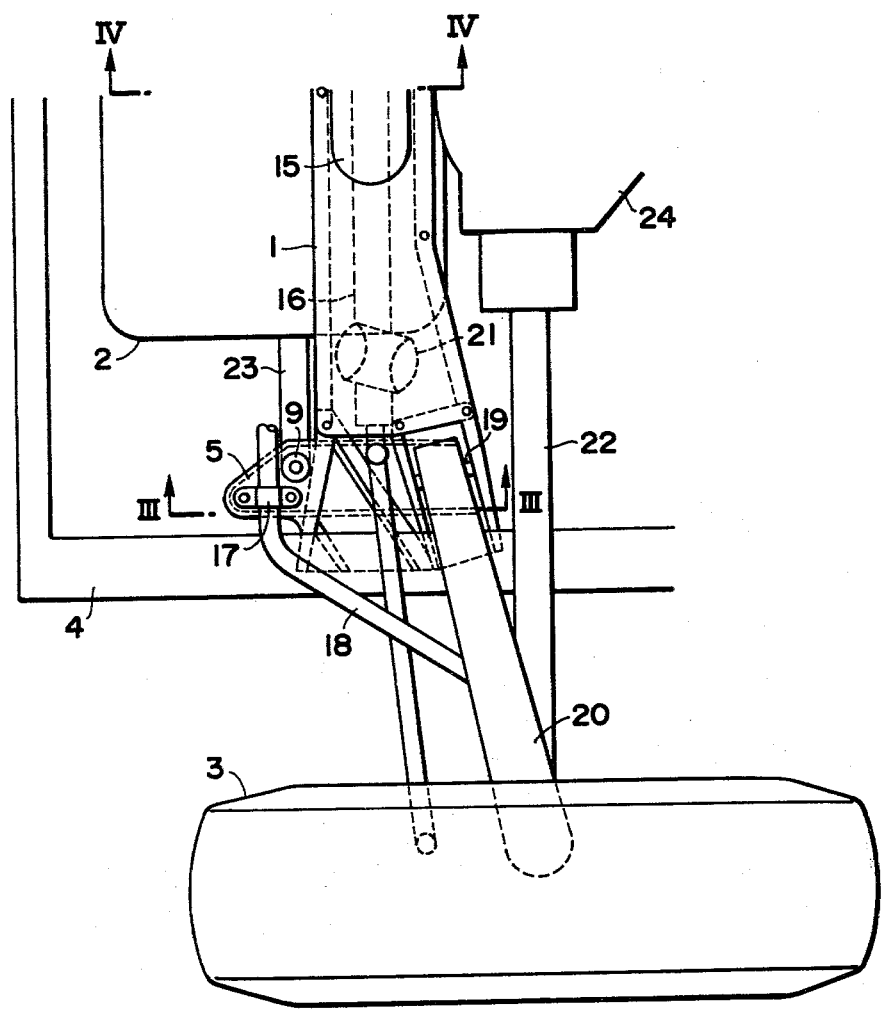
FIG. 1 is a bottom view of a front wheel supporting device for a motor vehicle in accordance with the teachings of the present invention.
Figure 2:
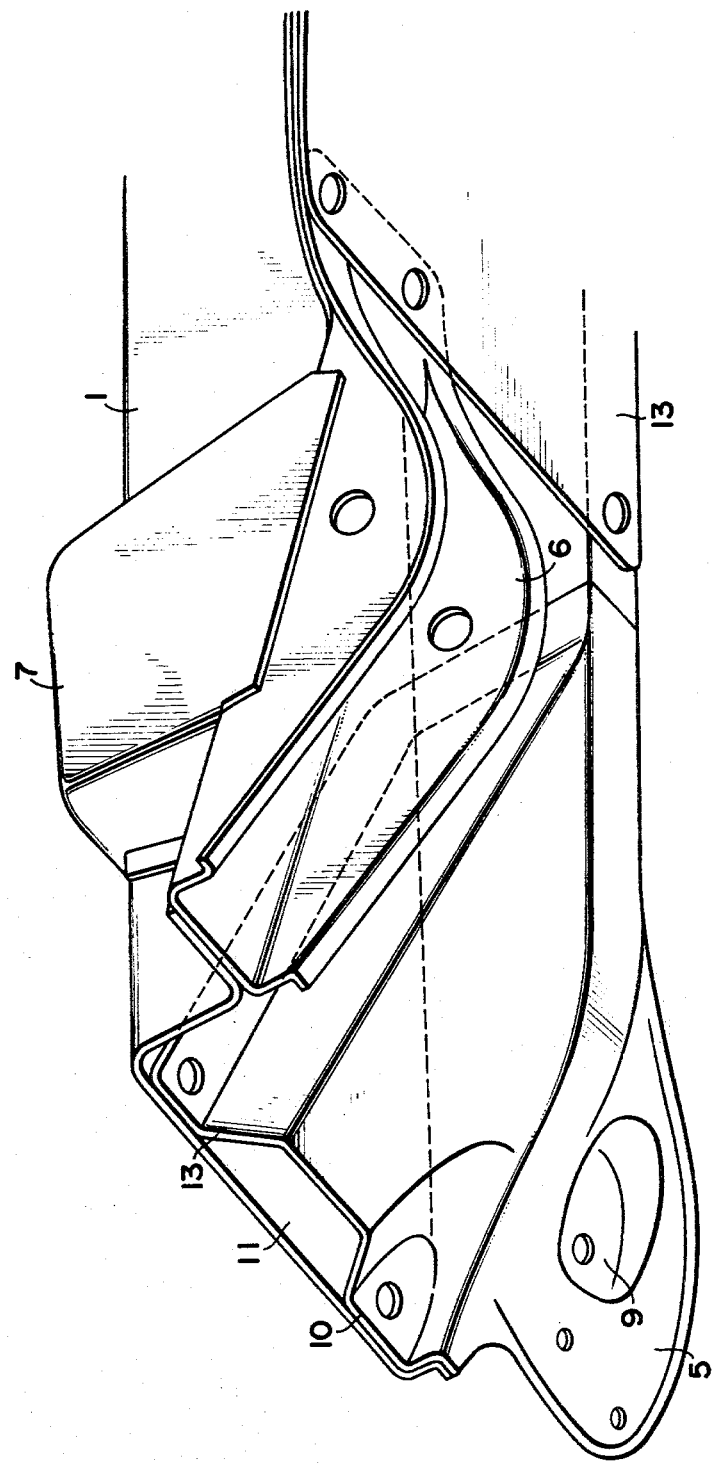
FIG. 2 is an oblique view illustrating the essential portion of the front wheel supporting device in accordance with the teachings of the present invention.

Referring more particularly to the drawings, shown in FIG. 1 is a bottom view illustrating a front wheel supporting device for a motor vehicle in accordance with the teachings of the present invention. This embodiment can particularly be applied to automobiles of the front engine-front drive type. As shown in FIG. 1, a suspension bracket 1 is provided between the front wheels 3 in a cross-wise direction of a motor vehicle body and under the engine 2. As can be seen from the enlarged central portion of the suspension bracket 1 in FIG. 2, it has a cross-sectional shape of substantially U and is provided on a frame 4 of the motor vehicle with the opening of the U directed downwardly. Additionally, opposite end portions of the suspension bracket 1 each have an outwardly flaring shape. The forward end of the end portion is formed with a stabilizer support portion 5 and the rearward end thereof is integrally provided with a lower arm bracket 6. Furthermore an engine mount bracket 7 is integrally provided on the suspension bracket 1 as the upper and outer surfaces thereof in the vicinity of the opposite ends in such a manner that the engine mount bracket 7 spans from the stabilizer support portion 5 to the lower arm bracket 6 as shown in FIGS. 2 and 3.

Figure 3:
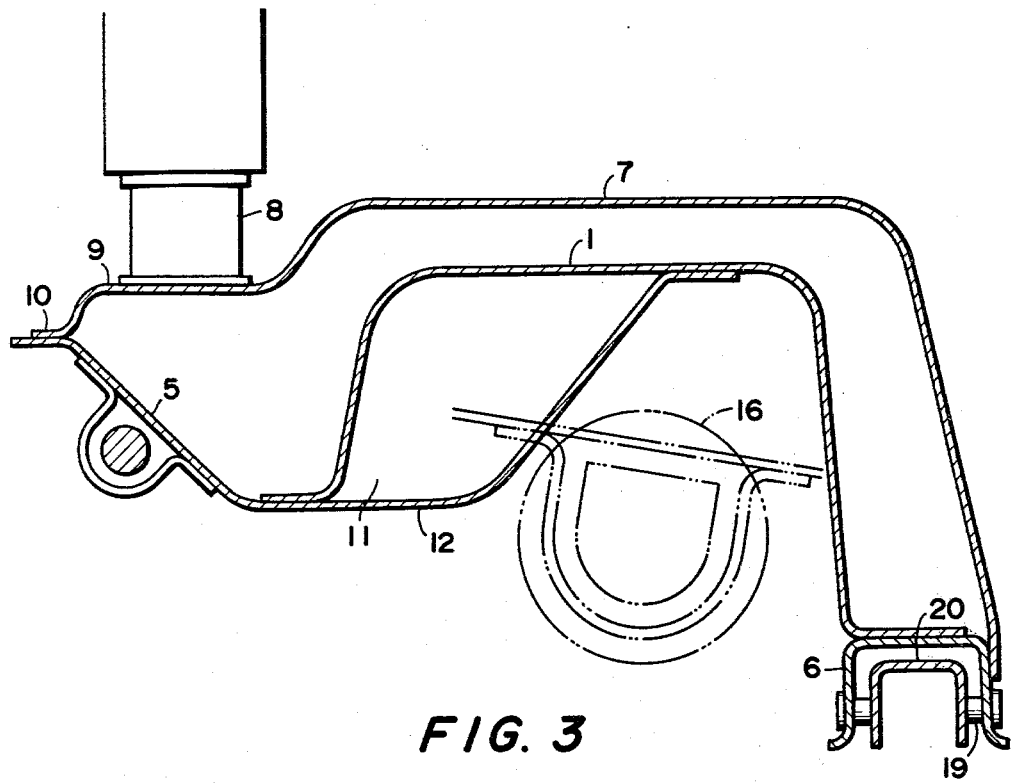
FIG. 3 is a large sectional view of the embodiment of FIG. 1 taken along the line III—III as shown in an inverted manner.

As shown in FIG. 3, the engine mount bracket 7 is formed with an engine mount portion 9 for supporting an engine mount 8 at the upper surface on the forward end thereof. Furthermore, mounted on the suspension bracket 1 is a reinforcing plate 12 forming a closed cross-section 11 by surrounding the under forward half portion of the inner under surface of the suspension bracket 1. The reinforcing plate 12 spans from a mounting portion 10 where the suspension bracket 1 is mounted on the frame 4 to the engine mount bracket 7. The outer end of the reinforcing plate 12 is superimposed on the mounting portion 10 thereby forming a reinforcement for the mounting portion 10.

Additionally, the under surface of the suspension bracket 1 is closed by a plate like lower member 13 with the portion outward of the lower arm bracket 6 being left open to thereby form a closed cross-section. As shown in FIG. 2, the outer end of the lower member 13 is superimposed on the inner end portion of the lower arm bracket 6 and clampingly secured to a flange portion 1-A of the suspension bracket 1 by means of nuts and bolts.

Figure 4:
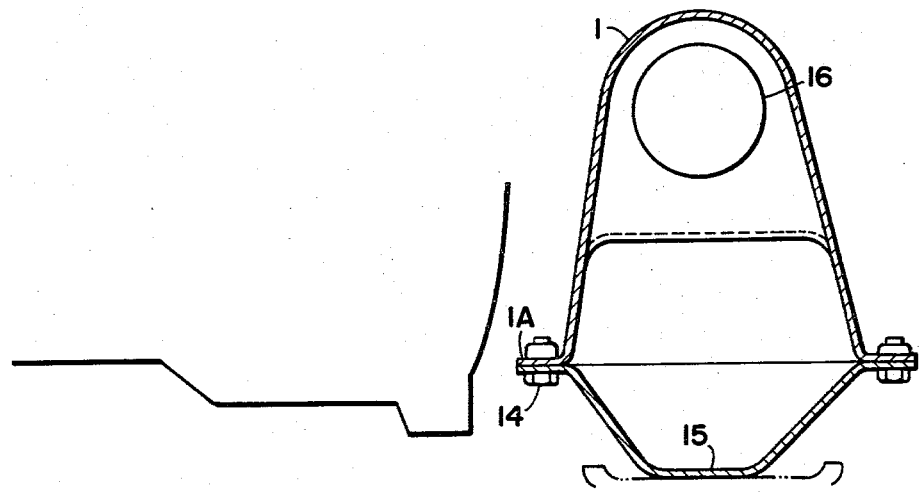
FIG. 4 is an enlarged sectional view of the embodiment of FIG. 1 taken along the line IV—IV and is shown in an inverted manner.

The center portion of the lower member 13 in the crosswise direction of the motor vehicle body is extended downwardly to thereby form a protector and a jack point 15 as shown in FIG. 4. Additionally, the center portion of the suspension bracket 1 in the crosswise section of the motor vehicle body is also expanded outwardly to thereby house therein a steering rod 16.

The suspension members integrally formed with one another as described above are mounted on the frame 4 as shown in FIGS. 1, 3, and 4. Stabilizers 18 are mounted on the stabilizer support portions 5 via stabilizer bearings 17. Lower arms 20 are supported by the lower arm bracket 6 via shafts 19 and a steering gear box 21 is provided between the suspension bracket 1 and the lower member 13 and a steering rod 16 extends therefrom. In FIG. 1, the front portion of motor vehicle includes an axle shaft 22, a bracket 23 for connecting the engine to and the front engine mount 8 and a driving section 24 of a speed change gear box.

As described above, the front wheel supporting device of the present invention includes a laterally elongated suspension bracket having a cross-section of substantially U shape and provided on the under surface of the forward portion of a motor vehicle body with the opening of the U directed downwardly and lower arm bracket supports provided adjacent the opposite ends of the lower arm brackets for supporting the forward ends of the lower arms extending inwardly of the front wheels which in turn are disposed on the outside of the brackets. Furthermore, a steering gear box is provided in the hollow space between the suspension bracket and the lower arm bracket which is operationally associated with the steering wheel and a steering rod outwardly extending from the steering gear box. The front wheel support device is further characterized by an engine mount bracket integrally provided on the suspension bracket at the upper and outer surfaces of the suspension bracket and an engine is coupled to and supported by the engine mount bracket. Hence, the engine, the front suspension lower arms and the steering gear box are supported by one and the same member so that accuracies in positional relationship there between can be easily maintained and secured. In particular, in the case of a front engine front drive motor vehicle, the positional relationship between the engine and the front suspension forms a serious problem and hence the arrangement described above can be advantageously applied to front engine front drive motor vehicles.

Furthermore, such an advantage can be attained that in the case of front drive front engine motor vehicles, the lower arm support points can be located as close as possible to the axle shaft. Additionally, in the front wheel support device of the present invention, the engine mount bracket reinforces the lower arm bracket and therefore can provide firm support to a lower arm. Furthermore, in the present invention, the engine mount bracket is adapted to support the stabilizer at a portion adjacent the outer ends of the motor vehicle in the cross-wise direction thereof and hence accuracies in positional relationship between the engine, the front suspension, the steering gear box, etc., can be easily attained and secured. Furthermore, in the present invention the suspension bracket is formed at the lower interior portion thereof in a closed cross-section spanning from the portion where the suspension bracket is mounted on the motor vehicle body to the engine mount portion and therefore any plastic deformation in cross-section of the member is restricted thereby enabling the strength of the engine mount portions and the lower arm bracket portions to be improved.

In addition, since most of the suspension brackets in the cross-wise direction excluding the opposite ends thereof is formed in a closed cross-section with the lower opening thereof being closed by a lower member, the increased rigidity in vertical bending and torsion can be taken into consideration in the designing of the front wheel supporting device to such an extent as to enable one to reduce the weight of the motor vehicle.

In addition the front wheel supporting device of the present invention has the following advantages:

1. Since the lower member is expanded downwardly at the center portion thereof in the cross-wise direction of the motor vehicle, it forms a protector and a jack point and therefore protects the engine from being hit by small stones and the like during operation of the motor vehicle and jacking up of the motor vehicle is easily performed.

2. The engine, front suspension and steering mechanism can be all installed on the suspension bracket at one time before they are assembled into the motor vehicle and therefore efficient assembly of the motor vehicle can be achieved.

In all cases it is understood that the above described embodiment is merely illustrative of but one of the many possible specific embodiments which represent the applications of the principles of the present invention. Numerous and varied other arrangements can be readily devised by those skilled in the art in accordance with these principles without departing from the spirit and scope of the invention.

We claim:

1. A front wheel supporting device for a motor vehicle having an engine comprising:
   a laterally elongated suspension bracket of substantially U shape cross section provided on an undersurface of a forward portion of said motor vehicle with the opening of the U directed downwardly;
   lower arms;
   lower arms bracket provided within the front wheels of said motor vehicles for supporting the lower arms;

lower arm bracket supports provided on said suspension bracket; and engine mount bracket integrally installed on the suspension bracket at an upper and outer surfaces of said suspension bracket for coupling to and supporting said engine.

2. A front wheel supporting device according to claim 1 wherein said engine mount bracket is integrally provided on said suspension bracket in the vicinity of the opposite ends thereof so as to reinforce said lower arm bracket.

3. A front wheel supporting device according to claim 1 wherein said suspension bracket is formed into a closed cross-section at a lower interior portion spaning from where said suspension bracket is mounted on said motor vehicle to the engine mount portion.

4. A front wheel supporting device according to claim 1 comprising a lower member coupled to and closing the opening of U of said suspension bracket to form a closed cross-section except at the opposite ends of the suspension bracket and a steering gear box and steering rod housed in said closed cross-section.

5. A front wheel supporting device for a motor vehicle having an engine comprising:
- a laterally elongated suspension bracket of substantially U shape cross section provided on an undersurface of a forward portion of said motor vehicle with the opening of the U directed downwardly;
- lower arms;
- lower arms bracket provided within the front wheels of said motor vehicles for supporting the lower arms;
- lower arm bracket supports provided on said suspension bracket;
- engine mount bracket integrally installed on the suspension bracket at an upper and outer surface of said suspension bracket for coupling to and supporting said engine; and
- a stabilizer, at a position adjacent an outer ends of the motor vehicle in a cross-wise direction relative to said motor vehicle, said stabilizer being supported by said engine mount bracket.

6. A front wheel supporting device according to claim 5 comprising a lower member coupled to and closing the opening of U of said suspension bracket to form a closed cross-section except at the opposite ends of the suspension bracket and a steering gear box and steering rod housed in said closed cross-section.

7. A front wheel supporting device for a motor vehicle having an engine comprising:
- a laterally elongated suspension bracket of substantially U shape cross section provided on an undersurface of a forward portion of said motor vehicle with the opening of the U directed downwardly;
- lower arms;
- lower arms bracket provided within the front wheels of said motor vehicles for supporting the lower arms;
- lower arm bracket supports provided on said suspension bracket;
- engine mount bracket integrally installed on the suspension bracket at an upper and outer surfaces of said suspension bracket for coupling to and supporting said engine and in the vicinity of the opposite ends of said suspension bracket so as to reinforce said lower arm bracket; and
- a stabilizer, at a portion adjacent an outer ends of the motor vehicle in a cross-wise direction relative to said motor vehicle, said stabilizer being supported by said engine mount bracket.

8. A front wheel supporting device for a motor vehicle having an engine comprising:
- a laterally elongated suspension bracket of substantially U shape cross section provided on an undersurface of a forward portion of said motor vehicle with the opening of the U directed downwardly, said suspension bracket being formed into a closed cross-section at a lower interior portion spaning from where said suspension bracket is mounted on said motor vehicle to the engine mount portion;
- lower arms;
- lower arms bracket provided within the front wheels of said motor vehicles for supporting the lower arms;
- lower arm bracket supports provided on said suspension bracket; and
- engine mount bracket integrally installed on the suspension bracket at an upper and outer surfaces of said suspension bracket for coupling to and supporting said engine, and in the vicinity of the opposite ends of said suspension bracket so as to inforce said lower arm bracket.

9. A front wheel supporting device for a motor vehicle having an engine comprising:
- a laterally elongated suspension bracket of substantially U shape cross section provided on an undersurface of a forward portion of said motor vehicle with the opening of the U directed downwardly;
- lower arms;
- lower arms bracket provided within the front wheels of said motor vehicles for supporting the lower arms;
- lower arm bracket supports provided on said suspension bracket; and
- engine mount bracket integrally installed on the suspension bracket at an upper and outer surfaces of said suspension bracket for coupling to and supporting said engine and in the vicinity of the opposite ends of said suspension bracket so as to reinforce said lower arm bracket; and
- a lower member coupled to and closing the opening of U of said suspension bracket to form a closed cross-section except at the opposite ends of the suspension bracket and a steering gear box and steering rod housed in said closed cross-section.

10. A front wheel supporting device for a motor vehicle having an engine comprising:
- a laterally elongated suspension bracket of substantially U shape cross section provided on an undersurface of a forward portion of said motor vehicle with the opening of the U directed downwardly, said suspension bracket being formed into a closed cross-section at a lower interior portion spaning from where said suspension bracket is mounted on said motor vehicle to the engine mount portion;
- lower arms;
- lower arms bracket provided within the front wheels of said motor vehicles for supporting the lower arms;
- lower arm bracket supports provided on said suspension bracket;
- engine mount bracket integrally installed on the suspension bracket at an upper and outer surfaces of said suspension bracket for coupling to and supporting said engine; and lower member coupled to and closing the opening of U of said suspension bracket to form a closed cross-section except at the opposite ends of the suspension bracket and a steering gear box and steering rod housed in said closed cross-section.

11. A front wheel supporting device for a motor vehicle having an engine comprising:
a laterally elongated suspension bracket of substantially U shape cross-section provided on an undersurface of a forward portion of said motor vehicle with the opening of the U directed downwardly;
lower arms;
lower arms bracket provided within the front wheels of said motor vehicles for supporting the lower arms;
lower arm bracket supports provided on said suspension bracket;
engine mount bracket integrally installed on the suspension bracket at an upper and outer surface of said suspension bracket for coupling to and supporting said engine; and
a lower member bolted to and closing the opening of U of said suspension bracket to form a closed cross-section except at the opposite ends of the suspension bracket and a steering gear box and steering rod housed in said closed cross-section.

12. A front wheel supporting device according to claim 11 wherein said lower member is overlappingly coupled at an outer end to an end portion of said lower arm bracket thereby reinforcing said lower arm bracket.

13. A front wheel supporting device according to claim 11 said lower member is expanded downwardly at a center of said lower member in a cross-wise direction of said motor vehicle to form a protector and garage jack-up point.

14. A front wheel supporting device for a motor vehicle having an engine comprising:
a laterally elongated suspension bracket of substantially U shape cross section provided on an undersurface of a forward portion of said motor vehicle with the opening of the U directed downwardly;
lower arms;
lower arms bracket provided within the front wheels of said motor vehicles for supporting the lower arms;
lower arm bracket supports provided on said suspension bracket;
engine mount bracket integrally installed on the suspension bracket at an upper and outer surfaces of said suspension bracket for coupling to and supporting said engine; and
a lower member coupled to and closing the opening of U of said suspension bracket to form a closed cross-section except at the opposite ends of the suspension bracket and a steering gear box and steering rod housed in said closed cross-section, said lower member being overlappingly coupled at an outer end to an end portion of said lower arm bracket thereby reinforcing said lower arm bracket.

15. A front wheel supporting device according to claim 14 said lower member is expanded downwardly at a center of said lower member in a cross-wise direction of said motor vehicle to form a protector and garage jack-up point.

16. A front wheel supporting device for a motor vehicle having an engine comprising:
a laterally elongated suspension bracket of substantially U shape cross section provided on an undersurface of a forward portion of said motor vehicle with the opening of the U directed downwardly;
lower arms;
lower arms bracket provided within the front wheels of said motor vehicles for supporting the lower arms;
lower arm bracket supports provided on said suspension bracket;
engine mount bracket integrally installed on the suspension bracket at an upper and outer surfaces of said suspension bracket for coupling to and supporting said engine; and
a lower member coupled to and closing the opening of U of said suspension bracket to form a closed cross-section except at the opposite ends of the suspension bracket and a steering gear box and steering rod housed in said closed cross-section, said lower member being expanded downwardly at a center of said lower member in a cross-wise direction of said motor vehicle to form a protector and garage jack-up point.

* * * * *